United States Patent
Ichinose

(10) Patent No.: US 8,821,782 B2
(45) Date of Patent: Sep. 2, 2014

(54) METHOD AND APPARATUS FOR MANUFACTURING TIRE

(75) Inventor: Masayuki Ichinose, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 384 days.

(21) Appl. No.: 13/377,398

(22) PCT Filed: Jun. 10, 2010

(86) PCT No.: PCT/JP2010/003888
§ 371 (c)(1),
(2), (4) Date: Feb. 16, 2012

(87) PCT Pub. No.: WO2010/143446
PCT Pub. Date: Dec. 16, 2010

(65) Prior Publication Data
US 2012/0133081 A1  May 31, 2012

(30) Foreign Application Priority Data
Jun. 10, 2009 (JP) .................. 2009-139147

(51) Int. Cl.
*B29D 30/06* (2006.01)

(52) U.S. Cl.
USPC ..... 264/502; 264/326; 264/328.3; 264/328.4; 264/328.5; 264/501; 264/236; 264/297.5; 264/347; 425/58.1; 425/38; 425/28.1; 425/34.1; 425/47

(58) Field of Classification Search
CPC .......... B29D 30/0643; B29D 30/0633; B29D 30/0605; B29D 30/0603; B29D 30/0662
USPC ........ 264/326, 328.3, 328.4, 328.5, 501, 502, 264/236, 297.5, 347; 425/58.1, 38, 28.1, 425/34.1, 47
See application file for complete search history.

(56) References Cited

U.S. PATENT DOCUMENTS 3,054,141 A * 9/1962 Hammesfahr ............... 425/34.1
3,692,444 A * 9/1972 Hugger et al. ............... 425/58.1
(Continued)

FOREIGN PATENT DOCUMENTS

EP 2 025 487 A1 2/2009
JP 05131452 A * 5/1993 ............. B29C 33/02
(Continued)

OTHER PUBLICATIONS

JPO English machine translation of JP 05-131452, retrieved Apr. 10, 2014.*

(Continued)

*Primary Examiner* — Timothy Kennedy
(74) *Attorney, Agent, or Firm* — Sughrue Mion, PLLC

(57) ABSTRACT

A rim 58, 83 of a post cure inflator 60 can be changed in an easy and safety manner, while the amount of energy consumption is reduced.
A inflator body 61 having the lower rim 58 can be located at a lower position, and the upper rim 83 can be moved downward to a lower position. Thus, the lower rim 58 and the upper rim 83 can be changed at the lower position in response to the change of the type of the tire to be manufactured, whereby the changing operation is made easy and safety. Further, the upper rim 83 moves upward. With this configuration, a vulcanized tire T having a heavy weight only moves in a front and rear direction while being supported by the inflator 61(lower rim 58), whereby the amount of energy consumption can be reduced easily.

9 Claims, 4 Drawing Sheets

(56) References Cited

U.S. PATENT DOCUMENTS

| | | | |
|---|---|---|---|
| 4,092,090 A * | 5/1978 | Yuhas et al. | 425/58.1 |
| 5,344,295 A * | 9/1994 | Watanabe et al. | 425/29 |
| 5,352,104 A * | 10/1994 | Ichikawa et al. | 425/58.1 |
| 5,441,393 A * | 8/1995 | Fujieda et al. | 425/58.1 |
| 5,681,594 A * | 10/1997 | Irie | 425/34.1 |
| 6,338,620 B1 * | 1/2002 | Yamada et al. | 425/34.1 |
| 6,530,763 B2 * | 3/2003 | Irie | 425/34.1 |
| 6,554,597 B1 | 4/2003 | Ichimaru | |
| 6,610,238 B1 * | 8/2003 | Steidl et al. | 264/297.5 |
| 6,729,865 B2 * | 5/2004 | Ichimaru | 425/34.1 |
| 2003/0086993 A1 * | 5/2003 | Ichimaru | 425/38 |
| 2004/0013755 A1 * | 1/2004 | Ichimaru | 425/58.1 |
| 2005/0260294 A1 * | 11/2005 | Ichimaru | 425/35 |
| 2007/0084275 A1 * | 4/2007 | Gotou et al. | 73/146 |
| 2009/0123585 A1 | 5/2009 | Himeno et al. | |
| 2009/0311355 A1 * | 12/2009 | Hineno et al. | 425/58.1 |

FOREIGN PATENT DOCUMENTS

| | | |
|---|---|---|
| JP | 11-221826 A | 8/1999 |
| JP | 2000-158447 A | 6/2000 |
| JP | 2001-030256 A | 2/2001 |
| JP | 2007-320151 A | 12/2007 |

OTHER PUBLICATIONS

Extended European Search Report, dated May 31, 2013, issued in corresponding European Patent Application No. 10785977.9.

Chinese Office Action, dated Apr. 3, 2014, issued in corresponding Chinese Patent Application No. 201080035513.6.

* cited by examiner

METHOD AND APPARATUS FOR MANUFACTURING TIRE

TECHNICAL FIELD

The present invention relates to a method and an apparatus for manufacturing a tire, in which a green tire is vulcanized and then, is cooled to manufacture the tire.

RELATED ART

Conventionally, as a method and an apparatus for manufacturing a tire, there has been known Japanese Patent Application Laid-open No. 2000-158447, for example.

RELATED ART DOCUMENT

Patent Document

Patent Document 1: Japanese Patent Application Laid-open No. 2000-158447

This technique includes a lower mold, a retrieval unit, an upper mold, an inflator body, and a transporting means. The lower mold can move between a tire supplying position and a tire vulcanizing position among the tire supplying position, the tire vulcanizing position, and a tire retrieving position, each of which is arranged toward a rear-to-front direction so as to be spaced to each other, and on the lower mold, an installed green tire is placed at the tire supplying position. The retrieval unit is disposed in front of the lower mold, and is movable between the tire vulcanizing position and the tire retrieving position. Further, the retrieval unit has a lower rim of a post-cure inflator for elevatably holding a vulcanized tire, and is integrally coupled with the lower mold. The upper mold elevatably disposed at a tire vulcanizing position, and descends to cooperate with the lower mold positioned at the tire vulcanizing position to vulcanize the green tire, thereby obtaining a vulcanized tire. Further, the upper mold moves vertically while holding the vulcanized tire, whereby it is possible to deliver the vulcanized tire to the lower rim of the retrieval unit located at the tire vulcanizing position. The inflator body of the post cure inflator is disposed stationarily at the tire retrieving position, and has an upper rim capable of supporting the vulcanized tire. At the time when the vulcanized tire supported by the lower rim is lifted by the retrieval unit, the inflator body of the post cure inflator supports the vulcanized tire in cooperation with the lower rim, and supplies an inner pressure to cool the vulcanized tire. The transporting means transports the lower mold and the retrieval unit in the horizontal direction.

To manufacture the tire with the above-described manufacturing apparatus, the lower mold is located at the tire supplying position, and the retrieval unit having the lower rim is located at the tire vulcanizing position. At this time, the transferred green tire is placed on the lower mold. Then, the lower rim of the retrieval unit is moved upward, receives the vulcanized tire held by the upper mold, and is moved downward together with the vulcanized tire. Next, the lower mold having the green tire placed thereon and the lower rim (retrieval unit) supporting the vulcanized tire are transported forward in an integral manner with the transporting means until the lower mold reaches the tire vulcanizing position and the retrieval unit reaches the tire retrieving position.

Then, the upper mold is moved downward to vulcanize the green tire in cooperation with the lower mold. After the vulcanized tire is obtained, the upper mold holding the vulcanized tire is moved upward, and the lower rim and the vulcanized tire are also moved upward to support the vulcanized tire from above and below with the upper rim and the lower rim. Then, the vulcanized tire is cooled with the inflator body and the lower rim (retrieval unit), and the lower rim is moved downward to transport, to the feeding conveyor, the vulcanized tire that has been cooled. After this, the empty lower mold and the empty lower rim (retrieval unit) are moved rearward in an integral manner with the transporting means until the lower mold reaches the tire supplying position and the retrieval unit reaches the tire vulcanizing position. Then, as the upper mold is moved upward, the vulcanized tire can be retrieved from the lower mold, and the setting of the vulcanized tire to the post cure inflator and the feeding operation of the green tire to the vulcanization mold can be performed at the same time. With this configuration, it is possible to improve the operational efficiency as compared with the normal vulcanizer and the post cure inflator.

DISCLOSURE OF THE INVENTION

Problems to be Solved by the Invention

However, with this type of the conventional method and apparatus for manufacturing the tire, the inflator body of the post cure inflator is disposed stationarily at a higher position. Thus, in the case where the upper rim of the inflator body is changed in accordance with the change of the types of the tire to be manufactured, the changing operations have to be made at a higher place, which causes the inconvenience and poses a danger. Further, at the time of cooling the vulcanized tire, the vulcanized tire having a heavy weight has to be moved upward with the lower rim (retrieval unit) up to the inflator body, which requires a large amount of energy consumption.

An object of the present invention is to provide a method and an apparatus for manufacturing a tire capable of changing the rim of the post cure inflator in safety and easy manners, and reducing the amount of energy consumption.

Means for Solving the Problem

First, the above-described object can be achieved by a method for manufacturing a tire, including: a first step of, when, among a loading station, a vulcanization station, and a cooling station, each of which is disposed from a rear toward a front so as to be spaced to each other, a lower mold is located at the loading station and an inflator body of a post cure inflator having a lower rim is located at the vulcanization station, placing a loaded green tire on the lower mold, lowering an upper mold holding a vulcanized tire disposed at the vulcanization station, transferring said vulcanized tire to the lower rim of the inflator body, and then, moving upward an empty upper mold; a second step of integrally moving forward the lower mold having the green tire placed thereon and the inflator body supporting the vulcanized tire by means of transporting means until the lower mold reaches the vulcanization station and the inflator body reaches the cooling station; a third step of lowering the upper mold to vulcanize the green tire with the upper mold and the lower mold located at the vulcanization station to obtain the vulcanized tire, moving upward the upper mold holding said vulcanized tire, lowering the upper rim of the post cure inflator provided at the cooling station to support the vulcanized tire with the upper rim and the inflator body, cooling the vulcanized tire with the upper rim and the inflator body, and moving upward said upper rim; and a fourth step of integrally moving rearward the empty lower mold and the empty inflator body by means of the transporting means until the lower mold reaches the loading station and the inflator body reaches the vulcanization station.

Second, the above-described object can be achieved by apparatus for manufacturing a tire, including: a lower mold capable of moving between a loading station and a vulcanization station among the loading station, the vulcanization station, and a cooling station, each of which is disposed from a rear toward a front so as to be spaced to each other, said lower mold having a loaded green tire placed thereon; an inflator body of a post cure inflator disposed in front of the lower mold and capable of moving between the vulcanization station and the cooling station, said inflator body having a lower rim capable of supporting a vulcanized tire, and said inflator body being capable of moving together with the lower mold in an integral manner; an upper mold disposed at the vulcanization station so as to be able to move upward and downward, said upper mold moving downward to be located at the vulcanization station and to vulcanize the green tire together with the lower mold located at the vulcanization station to obtain the vulcanized tire, said upper mold moving upward and downward while holding said vulcanized tire, so that said vulcanized tire can be transferred to the lower rim of the inflator body located at the vulcanization station; an upper rim of the post cure inflator disposed at the cooling station so as to be able to move upward and downward, said upper rim moving downward to support the vulcanized tire with the upper rim and the inflator body located at the cooling station while cooling the vulcanized tire; and transporting means that transports the lower mold and the inflator body in a front-to-rear direction.

Effect of the Invention

According to the present invention, the inflator body having the lower rim is provided at a lower position, and by lowering the upper rim, the upper rim can be moved to the lower position. With this configuration, at the time of changing the upper rim and the lower rim in response to the change of the type of the tire to be manufactured, the changing operation can be performed at the lower position, so that the operation can be performed in a safety and easy manner. Further, the upper rim moves upward and downward. Thus, the vulcanized tire having the heavy weight only moves in the front-to-rear direction while being supported by the inflator body (lower rim), so that the amount of energy consumption can be easily lowered.

It should be noted that, in the present invention, it may be possible to employ a configuration in which the lower mold and the inflator body are designed so as to be able to be separated from each other, and at the time of changing the upper mold, the lower mold, the upper rim, and the lower rim, the lower mold and the upper mold placed on the lower mold are moved with the transporting means so as to be located at the loading station, and the inflator body is moved with the transporting means so as to be located at the cooling station. With this configuration, at the time of changing the upper mold, the lower mold, the upper rim, and the lower rim in response to the change of types of the tire to be manufactured, the upper mold, the lower mold, the upper rim, and the lower rim can be changed at the loading station and the cooling station having the wide space, whereby the operation efficiency improves.

Further, in the present invention, the transporting means may be configured by a first transporting mechanism moving the lower mold while performing the servo control, and a second transporting mechanism moving the inflator body while performing the servo control to move the lower mold and the inflator body in an integral manner or in a separate manner with the first and the second transporting mechanisms. With this configuration, the lower mold and the inflator body can be moved integrally or separately in a precise manner with ease.

Further, in the present invention, it may be possible to employ a configuration in which a linkage tool capable of linking and disengaging the lower mold and the inflator body is provided; the lower mold and the inflator body are linked to each other with the linkage tool at the time of manufacturing the tire; and the linking with the linkage tool is disengaged at the time of changing the upper mold, the lower mold, the upper rim, and the lower rim. With this configuration, the lower mold and the inflator body can be reliably linked to each other (can be integrally move) at the time of manufacturing the tire.

Further, in the present invention, it may be possible to employ a configuration in which: the upper rim is provided with a supporting body capable of supporting the vulcanized tire; a conveyor connected to the inflator body and capable of entering and retracting from the cooling station with the movement of the inflator body is provided; when the inflator body is located at the cooling station, the upper rim moves upward after the vulcanized tire that has been cooled is supported by the supporting body, the conveyor enters the cooling station with the movement of the inflator body to the vulcanization station, and the vulcanized tire is released from the supporting by the supporting body and is supplied to the conveyor. With this configuration, the vulcanized tire can be easily fed without requiring the other feeding means such as an unloader unit.

BEST MODE FOR CARRYING OUT THE INVENTION

Hereinbelow, an embodiment 1 according to the present invention will be described with reference to the drawings.

Figure 1:
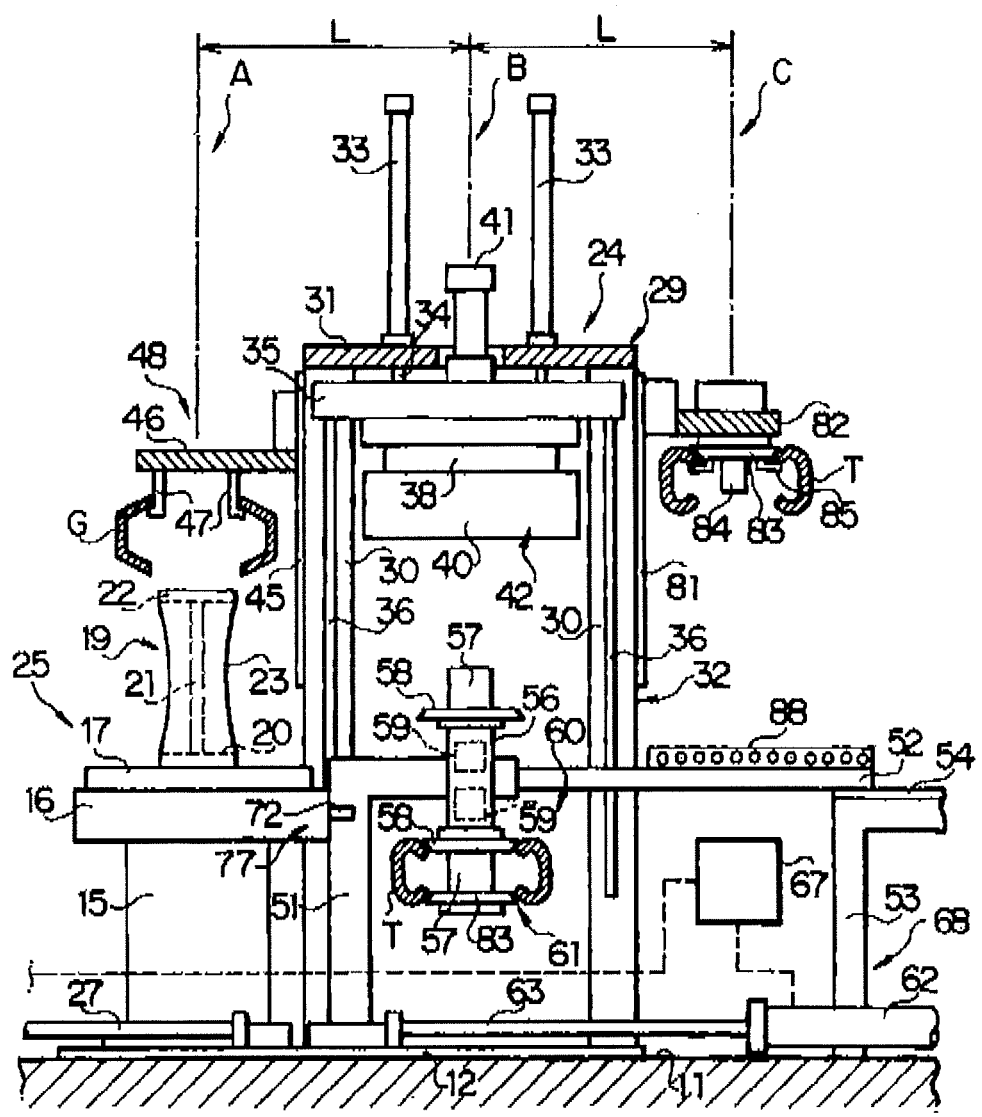
FIG. 1 is a partial sectional front view schematically illustrating an embodiment 1 according to the present invention.
Figure 2:
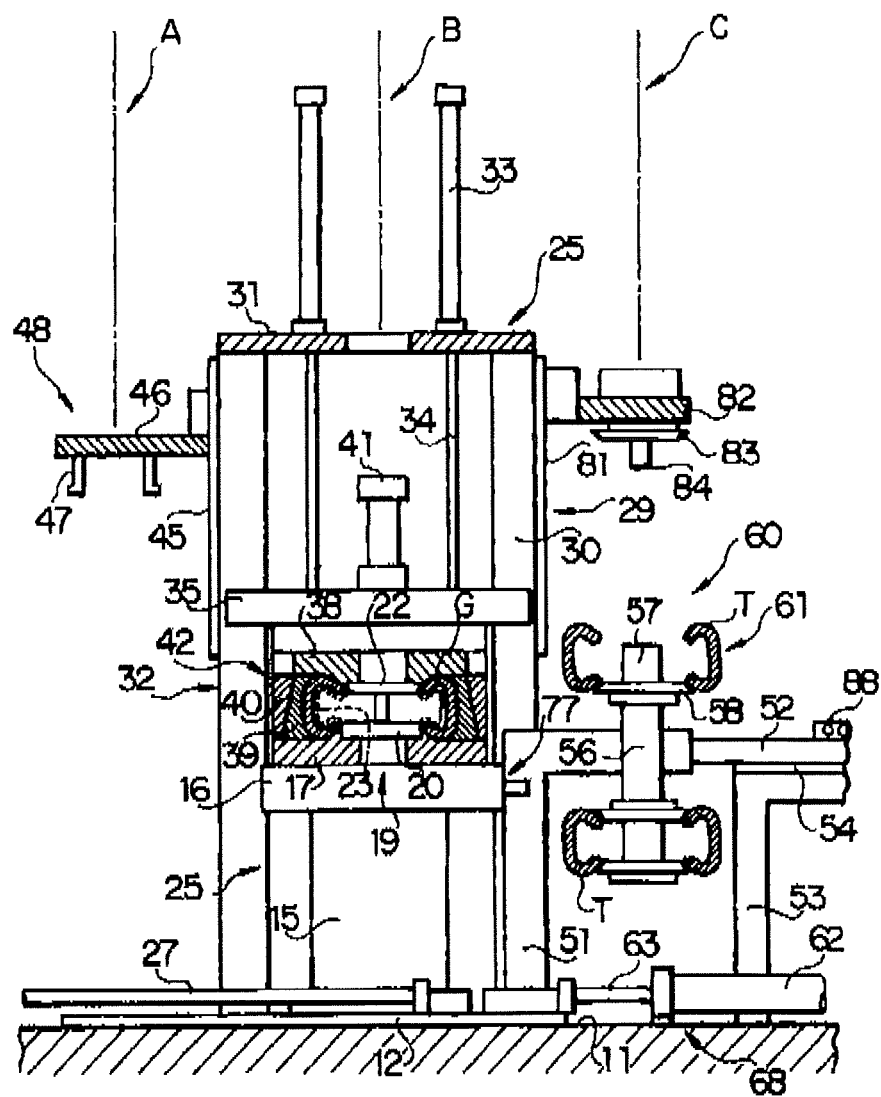
FIG. 2 is a partial sectional front view schematically illustrating the embodiment 1 as in FIG. 1 for explaining a manufacturing method.

In FIG. 1 and FIG. 2, A, B, and C represent three stations set above a floor surface 11, namely, a loading station, a vulcanization station, and a cooling station, respectively. The loading station A, the vulcanization station B, and the cooling station C are arranged on the same straight line toward the direction from the rear to the front, each of which is spaced at an equal distance L. 12 represents a guide rail disposed on the floor surface 11 and extending in the front and rear direction. The guide rail 12 extends in a manner that penetrates at least the loading station A and the vulcanization station B.

15 represents a movable table supported by the guide rail 12 in a slidable manner. The movable table 15 can move in the front and rear direction between the loading station A and the vulcanization station B along the guide rail 12. 16 represents a lower base having a horizontal and plate-like shape and fixed on the upper end of the movable table 15. On the upper surface of the lower base 16, a lower mold 17 serving as a lower mold and provided with a platen is attached in a detachable manner. The lower mold 17 can mainly form a lower side of a side wall portion and a lower side of a bead portion of a green tire G at the time of vulcanizing the green tire G.

19 represents a center mechanism disposed at the center portion of the lower mold 17. The center mechanism 19 has a lower clamp ring 20 supported by the lower mold 17, a center post 21 extending in the vertical direction and capable of moving upward and downward, an upper clamp ring 22 fixed on an upper end of the center post 21, and an inflatable and deflatable bladder 23, the lower end and the upper end of the bladder 23 being engaged with the lower clamp ring 20 and the upper clamp ring 22, respectively, in a manner that can maintain an airtight state. The movable table 15, the lower base 16, the lower mold 17, the center mechanism 19 as a whole form a lower mechanism 25 of a vulcanization unit 24.

A not-shown first servo cylinder serving as a first driving mechanism is placed rearward than the loading station A on the floor surface 11 in a manner that extends in the front and rear direction. The first servo cylinder has a piston rod 27 with a top end (front end) connected with the movable table 15. With this configuration, the first servo cylinder operates to protrude and retract the piston rod 27, and the lower mechanism 25 of the vulcanization unit 24 including the lower mold 17 can move in the front and rear direction between the loading station A and the vulcanization station B while being guided by the guide rail 12.

29 represents a vulcanization unit body of the vulcanization unit 24 disposed at the vulcanization station B. The vulcanization unit body 29 includes four columns 30 placed on the floor surface 11 around the vulcanization station B, and a frame 32 formed by a horizontal top plate 31 fixed on the upper end of the columns 30. On the upper end (top plate 31) of the frame 32, plural lift cylinders 33 extending in the vertical direction is attached. On the end (lower end) of a piston rod 34 of each of the lift cylinders 33, an upper base 35 having a horizontal and plate-like shape and forming a pair with the lower base 16 is fixed. Further, with the operation of the lift cylinders 33, the upper base 35 can vertically move along a guide rail 36 installed to the columns 30 and extending in the vertical direction.

On the lower surface of the upper base 35, an upper mold 38 including a platen is attached in a detachable manner. The upper mold 38 can mainly form an upper side of the side wall portion and a lower side of the bead portion of the green tire G at the time of vulcanizing the green tire G. 39 represents plural sector molds disposed immediately below the upper mold 38. The sector molds 39 each have an arcuate shape, and are arranged in the circumferential direction. Further, the sector molds 39 can mainly form a tread portion of the green tire G at the time of vulcanizing the green tire G.

40 represents an outer ring disposed so as to surround the sector molds 39. The inner circumference of the outer ring 40 and the outer circumference of the sector molds 39 are formed by a part of a conical surface sloping and widening from the top toward the bottom. 41 represents an expandable and contractible cylinder attached to the upper base 35. With the operation of the expandable and contractible cylinder 41, the outer ring 40 moves upward and downward. This movement causes the sector molds 39 to synchronously move, and expand/contract in the radial direction with a wedge action of the outer circumference of the sector molds 39 and the inner circumference of the outer ring 40. The upper mold 38 and the sector molds 39 as a whole form an upper mold 42 disposed at the vulcanization station B. With the operation of the lift cylinder 33, the upper mold 42 can move upward and downward together with the upper base 35.

As described above, the vulcanization unit 24 is divided into the vulcanization unit body 29 located at the vulcanization station B and the lower mechanism 25 movable between the loading station A and the vulcanization station B. Under the condition that the lower mechanism 25 is located at the vulcanization station B and the green tire G is placed on the lower mold 17 of this lower mechanism 25, by moving downward the upper base 35 and the upper mold 42 with the operation of the lift cylinder 33, the green tire G is contained in a vulcanization space formed by the lower mold 17 and the upper mold 42. At this time, with the supply of a vulcanization medium having a high temperature and high pressure in the bladder 23 of the center mechanism 19, the upper mold 42 vulcanizes the green tire G with the lower mold 17 positioned at the vulcanization station B to obtain a vulcanized tire T.

If the sector molds 39 are located on the inner side in the radial direction after the completion of the vulcanization, the upper mold 42 can keep holding the vulcanized tire T. Thus, if the upper mold 42 moves upward in this state, the vulcanized tire T also moves upward while being held by the upper mold 42. Note that, in the present invention, the vulcanization mold may be configured by two divided molds including the upper mold and the lower mold. In this case, the upper mold cannot move upward while holding the vulcanized tire T. This inconvenience can be solved by providing the upper mold with plural holding claws capable of synchronously moving in the radial direction and holding the vulcanized tire T.

On the rear side surface of the column 30 located on the rear side, a guide rail 45 extending in the vertical direction is provided. On the guide rail 45, a transferring carriage 46 is supported in a slidable manner. The transferring carriage 46 receives a driving force from a not-shown driving mechanism, whereby the transferring carriage 46 can move upward and downward while being guided by the guide rail 45. On the transferring carriage 46, plural holding claws 47 are supported so as to be spaced in the circumferential direction. The holding claws 47 receive a driving force from a not-shown driving mechanism, so that they can synchronously move in the radial direction.

When the green tire G is installed to the loading station A with a loading means such as a not-shown loader and a forklift, the holding claws 47 synchronously move outwards in the radial direction, come into contact with the upper side of the bead portion of the green tire G, and hold the green tire G from the inner side. Then, a transferring mechanism 48 formed by the transferring carriage 46 and the holding claws 47 descends together with the green tire G, and the green tire G is placed on the lower mold 17 located at the loading station A. After this, the holding claws 47 synchronously move inwards in the radial direction, and are detached from the green tire G. Then, the empty transferring mechanism 48 moves upward until the upper limit thereof.

51 represents an L-shaped slide frame disposed frontward than the lower mechanism 25, and the lower end of the slide frame 51 is slidably engaged with the guide rail 12. The slide frame 51 has a front end fixed with a rear end of a supporting plate 52 horizontally extending frontward. 53 represents a fixed frame disposed on the floor surface 11 and in front of the cooling station C. On the upper surface of the fixed frame 53, a guide rail 54 extending in the front and rear direction is provided. The supporting plate 52 engages with the guide rail 54 in a slidable manner. This enables the slide frame 51 and the supporting frame 52 to integrally move in the front and rear direction while being guided by the guide rails 12 and 54, respectively.

56 represents a cylindrical rotation case supported by the slide frame 51. The rotation case 56 can intermittently rotate by 180° with a not-shown motor with a horizontal axis being as a center. At the time when not rotating, the rotation case 56 extends in the vertical direction. At each end of the rotation case 56, a lower rim 58 having a lower fastening body 57 is supported in a rotatable manner. The lower rim 58 receives a driving force from a driving motor 59 serving as a driving mechanism contained in the rotation case 56, so that it can move around an axis of the rotation case 56. The rotation case 56, the lower rim 58, the driving motor 59, and a not-shown inner pressure supplying mechanism as a whole form an inflator body 61 of a post cure inflator 60. The post cure inflator 60 supplies the inner pressure to the vulcanized tire T, and rotates the vulcanized tire T while holding the vulcanized tire T in a predetermined shape, thereby cooling the vulcanized tire T. Note that, in the present invention, the driving mechanism is not essential to the inflator body, and can be omitted.

A second servo cylinder 62 serving as a second transporting mechanism is disposed on the floor surface 11 and in front of the vulcanization station B so as to extend in the front and rear direction. The second servo cylinder 62 have a piston rod 63 having an end (rear end) connected to the slide frame 51. With this configuration, the second servo cylinder 62 operates to protrude and retract the piston rod 63, so that the inflator body 61 disposed frontward of the lower mold 17 can move in the front and rear direction between the vulcanization station B and the cooling station C. 67 represents a control means for performing servo control of the first servo cylinder and the second servo cylinder 62. The control means 67 performs the servo control of the first servo cylinder and the second servo cylinder 62, so that the lower mold 17 and the inflator body 61 can move integrally or separately in the front and rear direction.

Figure 3:
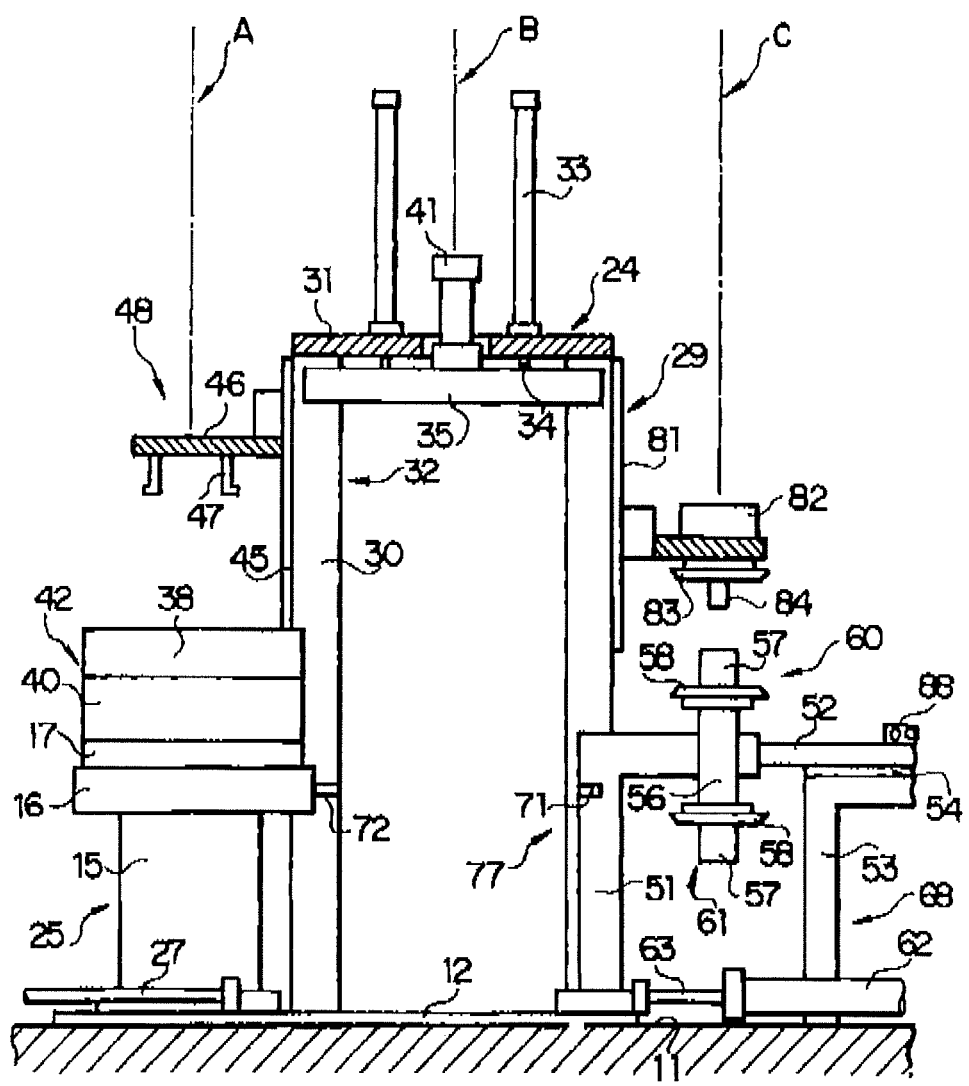
FIG. 3 is a partial sectional front view schematically illustrating the embodiment 1 as in FIG. 1 for explaining an operation of changing a mold and a rim.

For example, when the lower mold 17 and the inflator body 61 are located at the loading station A and the vulcanization station B, respectively, the lower mold 17 and the inflator body 61 can be moved integrally to the vulcanization station B and the cooling station C with the first servo cylinder and the second servo cylinder 62. Further, when the lower mold 17 and the inflator body 61 are located at the vulcanization station B and the cooling station C, respectively, the lower mold 17 and the inflator body 61 can be moved integrally to the loading station A and the vulcanization station B in a similar manner. Alternatively, by separately moving the lower mold 17 and the inflator body 61 with the first servo cylinder and the second servo cylinder 62, the lower mold 17 can be moved to the loading station A, and the inflator body 61 can be moved to the cooing station C, as illustrated in FIG. 3.

The first servo cylinder and the second servo cylinder 62 as a whole form a transporting means 68 that transports the lower mold 17 and the inflator body 61 in the front and rear direction. By configuring the transporting means 68 by the first servo cylinder that transports the lower mold 17 through the servo control and the second servo cylinder 62 that transports the inflator body 61 through the servo control as described above, the lower mold 17 and the inflator body 61 can be moved integrally or moved separately with ease and high precision.

After the complete of the vulcanization as described above, the upper mold 42 moves once upward up to the upper limit while holding the vulcanized tire T, and the lower mold 17 and the inflator body 61 move to the loading station A and the vulcanization station B, respectively. Then, by moving the upper mold 42 downward together with the vulcanized tire T, the vulcanized tire T is supplied to the inflator body 61 located at the vulcanization station B. At this time, the sector molds 39 move outwards in the radial direction as the outer ring 40 moves upward, and the vulcanized tire T is transferred to the lower rim 58 of the inflator body 61. Thus, the lower rim 58 supports, from below, the lower side of the bead portion of the supplied vulcanized tire T.

Figure 4:
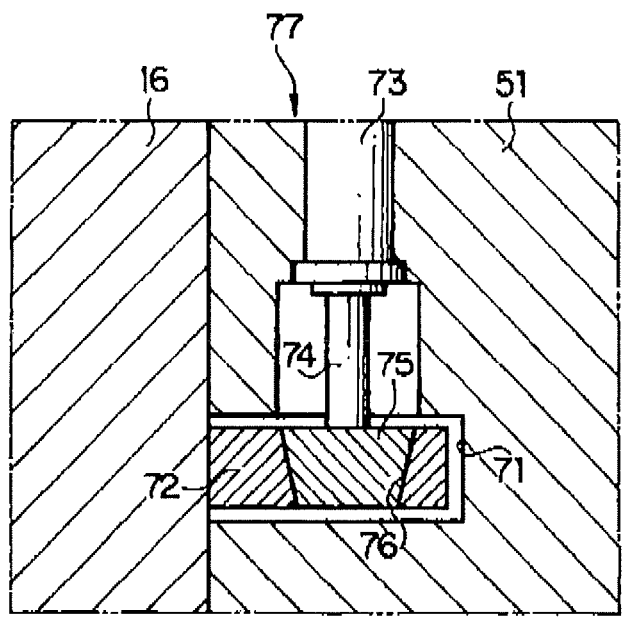
FIG. 4 is a sectional front view illustrating a vicinity of a linkage tool.

In FIG. 1 and FIG. 4, the rear surface of the upper portion of the slide frame 51 has an insertion hole 71 having a rectangular shape in cross section. Further, the front surface of the lower base 16 has an insertion protrusion 72 fixed thereon at a height equal to the insertion hole 71 and protruding toward the slide frame 51. In the slide frame 51 and above the insertion hole 71, a linkage cylinder 73 extending in the vertical direction is provided. The linkage cylinder 73 has a piston rod 74 having an end (lower end) fixed to a linkage block 75 having a shape of circular truncated cone narrowing from the top toward the bottom. Further, the insertion protrusion 72 has a linkage hole 76 having a shape of circular truncated cone narrowing from the top toward the bottom. The linkage hole 76 has the taper angle same as that of the linkage block 75.

Further, the insertion protrusion 72 is inserted into the insertion hole 71 when the lower base 16 and the slide frame 51 reach a position at which both come into contact to each other. At this time, by operating the linkage cylinder 73 to insert the linkage block 75 into the linkage hole 76, the lower base 16 (lower mold 17) and the slide frame 51 (inflator body 61) are linked to each other with the linkage block 75 and the linkage hole 73. The insertion protrusion 72, the linkage cylinder 73, and the linkage block 75 as a whole form a linkage tool 77 capable of linking and disengaging the lower mold 17 and the inflator body 61. The linkage tool 77 links the lower base 16 and the slide frame 51 such that the lower mold 17 and the inflator body 61 can move integrally. Alternatively, the linkage tool 77 can disengage the linkage between the lower base 16 and the slide frame 51 such that the lower mold 17 and the inflator body 61 can move separately.

By providing the linkage tool 77 capable of linking and disengaging the lower mold 17 and the inflator body 61 as described above, it is possible to reliably link (integrally move) the lower mold 17 and the inflator body 61 at the time of manufacturing the tire. Note that, in the present invention, it may be possible to employ a bayonet or pin as the linkage tool. 81 represents a guide rail extending in the vertical direction and provided on the front side surface of the column 30 located on the front side. On the guide rail 81, a holding body 82 is supported in a slidable manner. In FIG. 1 and FIG. 2, 83 represents an upper rim of the post cure inflator 60 located at the cooling station C. The upper rim 83 forms a pair with the lower rim 58 of the inflator body 61, and is held by the holding body 82 in a detachable manner. Further, the holding body 82 receives a driving force from a not-shown driving mechanism, and can move upward and downward. With this configuration, the upper rim 83 and the holding body 82 can move upward and downward in an integral manner.

84 represents an upper fastening body provided to the upper rim 83. The upper fastening body 84 integrally link the lower rim 58 and the upper rim 83 when the holding body 82 descends, and is fastened to the lower fastening body 57 at the time when the inflator body 61 is located at the cooling station C. After the lower rim 58 and the upper rim 83 are linked as described above, the upper rim 83 supports, from above, the upper bead portion of the vulcanized tire T supported by the lower rim 58. Then, the holding body 82 releases the upper rim 83 from the holding and moves upward. The vulcanized tire T supported by the upper rim 83 and the lower rim 58 from above and below is inflated with a predetermined inner pressure supplied from an inner-pressure supplying mechanism, while the lower rim 58, the upper rim 83, and the vulcanized tire T are integrally rotated by the driving motor 59. With this configuration, the vulcanized tire T is cooled while being rotated by the lower rim 58 and the upper rim 83 of the inflator body 61.

85 represents plural supporting bodies provided to the upper rim 83. These supporting bodies 85 can synchronously move in the radial direction. When moving outwards in the radial direction, the supporting bodies 85 are brought into contact with the upper side of the bead portion of the vulcanized tire T after cooling, and can support the vulcanized tire from the inside. When the supporting bodies 85 support the vulcanized tire T, the fastening between the upper fastening body 84 and the lower fastening body 57 is disengaged. Then, the holding body 82 ascends up to the upper limit together with the vulcanized tire T, which makes the vulcanized tire T lifted straightly above the inflator body 61 at the cooling station C.

88 represents a conveyor fixed on the upper surface of the supporting plate 52 and transporting the supplied vulcanized tire T frontwards. The conveyor 88 is connected to the inflator body 61 through the supporting plate 52 and the slide frame 51. This conveyor 88 is located at a retracted position in front of the cooling station C when the inflator body 61 is located at the cooling station C. And, the conveyor 88 enters the cooling station C as the sliding frame 51 and the supporting plate 52 move to make the inflator body 61 move rearwards from the cooling station C to the vulcanization station B.

As described above, with the movement of the inflator body 61, the conveyor 88 can enter the cooling station C and be retracted from the cooling station C. Further, as described above, the upper rim 83 and the vulcanized tire T supported by the supporting bodies 85 are moved upward up to the upper limit, and the inflator body 61 is moved to the vulcanization station B, whereby the conveyor 88 is made enter the cooling station C. After this, as the vulcanized tire T is released from the support by the supporting bodies 85, the vulcanized tire T is supplied to the conveyor 88. By providing the supporting bodies 85 to the upper rim 83 as described above and connecting the conveyor 88 to the inflator body 61, the vulcanized tire T can be easily fed frontwards (next process) without needing an unloader unit or other feeding means.

Next, operations of the embodiment 1 will be described.

First, at the loading station A, the transferring mechanism 48 stops at the upper limit while holding the installed green tire G. The lower mold 17 is located at the loading station A in an empty state. The center post 21 of the center mechanism 19 moves upward, and the bladder 23 has a substantially cylindrical shape. At the vulcanization state B, the upper mold 42 stops at the upper limit while holding the vulcanized tire T immediately after the vulcanization. The inflator body 61 is located at the vulcanization station B. The lower rim 58 located on the upper side of the inflator body 61 is empty, and the upper rim 83 is removed. At the vulcanization station C, the upper rim 83 moves upward up to the upper limit together with the holding body 82 and stops at the upper limit while holding, with the supporting bodies 85, the vulcanized tire T that has been cooled. The conveyor 88 enters the cooling station C immediately below the upper rim 83. FIG. 1 illustrates the state described above.

Next, at the loading station A, the transferring mechanism 48 and the green tire G descend while the center post 21 descends. This makes the green tire G placed on the lower mold 17, and the bladder 23 enter the green tire G.

Then, the holding claws 47 synchronously move inwards in the radial direction to release the green tire G from holding, and the transferring mechanism 48 moves upward again up to the upper limit. At this time, at the vulcanization state B, with the operation of the lift cylinder 33, the upper base 35 and the upper mold 42 holding the vulcanized tire T move downward. This downward movement stops at the time when the lower side of the bead portion of the vulcanized tire T is supported by the lower rim 58 of the inflator body 61 from below, and is transferred to this lower rim 58.

Next, with the expandable and contractible cylinder 41, the outer ring 40 is moved upward, the sector molds 39 are synchronously moved outwards in the radial direction, and the vulcanized tire T is released from the holding by the upper mold 42. Then, the empty upper mold 42 moves upward again up to the upper limit with the operation of the lift cylinder 33. At this time, at the cooling station C, the supporting bodies 85 synchronously move inwards in the radial direction after the upper rim 83 and the vulcanized tire T that has been cooled move downward. This makes the vulcanized tire T released from the holding by the supporting bodies 85, dropped on the conveyor 88, and transferred to this conveyor 88. Then, the empty upper rim 83 moves upward up to the upper limit. Note that it may be possible to employ a configuration in which the vulcanized tire T is dropped from the upper rim 83 located at the upper limit, and is supplied to the conveyor 88, provided that the vulcanized tire is supplied to the conveyor 88 without causing any trouble.

Next, in response to a control signal from the control means 67, the first servo cylinder and the second servo cylinder 62 are actuated so as to integrally move frontward the movable table 15 and the lower mold 17 having the green tire G placed thereon from the loading station A to the vulcanization station B, the inflator body 61 supporting the vulcanized tire T from the vulcanization station B to the cooling station C, and the conveyor 88 having the vulcanized tire placed thereon from the cooling station C to the retracted position in front of the cooling station C. With these operations, the lower mold 17 having the green tire G is located at the vulcanization station B, and the inflator body 61 supporting the vulcanized tire T is located at the cooling station C.

Next, when the next green tire G is loaded at the loading station A with the loading means, the holding claws 47 synchronously move outwards in the radial direction, and hold the upper side of the bead portion of this green tire G from the inner side. With this operation, the green tire G is held by the transferring mechanism 48. During the operations described above, the lower mechanism 25 is not positioned immediately below the transferring mechanism 48, and hence, there is a large space at the position immediately below the transferring mechanism 48, whereby the green tire G can be transferred easily. At the vulcanization station B, the upper mold 42 moves downward with the lift cylinder 33, and the sector molds 39 synchronously move inward in the radial direction with the expandable and contractible cylinder 41. With these movements, the green tire G is accommodated in the vulcanization space formed in the lower mold 17, the upper mold 38, and the sector molds 39.

Then, as illustrated in FIG. 2, as the high-temperature and high-pressure vulcanization medium is supplied in the bladder 23 of the center mechanism 19, the upper mold 42 together with the lower mold 17 vulcanizes the green tire G to obtain the vulcanized tire T. After the complete of the vulcanization described above, the upper mold 42 moves upward up to the upper limit with the operation of the lift cylinder 33. At this time, the sector molds 39 have been moved inwards in the radial direction and stay there, and hence, keep holding the vulcanized tire T even after the upper mold 42 reaches the upper limit. Note that, with the upper mold 42, the holding of the vulcanized tire T can be maintained, even if the sector molds 39 are located on the inner side in the radial direction than the outermost limit in the radial direction.

Further, at this time, the vulcanization medium is discharged from the inside of the bladder 23, and the center post 21 and the upper clamp ring 22 move upward, so that the bladder 23 changes its shape from a doughnut form to the cylinder form. At the cooling station C, the empty upper rim 83 stopping at the upper limit moves downward, and then, the upper fastening body 84 and the lower fastening body 57 are fastened to each other to link the lower rim 58 and the upper rim 83. At this time, the upper rim 83 supports, from above, the upper bead portion of the vulcanized tire T supported by the lower rim 58, whereby the vulcanized tire T is supported by the upper rim 83 and the lower rim 58 from above and below. Next, the upper rim 83 is released from the holding by the holding body 82, and the holding body 82 moves upward up to the upper limit. As the upper rim 83 moves upward and downward as described above, it is only necessary for the vulcanized tire T having a heavy weight to move in the front and rear direction while being supported by the inflator body 61 (lower rim 58), so that the energy consumption can be easily reduced.

Next, the inflator body 61 rotates by 180° around a horizontal axis, so that the vulcanized tire T that has been cooled is positioned on the upper side, and the vulcanized tire T to be cooled is positioned on the lower side. Next, a predetermined inner pressured is applied in the vulcanized tire T positioned on the lower side, and the lower rim 58, the upper rim 83, and the vulcanized tire T are rotated by the driving motor 59, so that the vulcanized tire T is cooled while being rotated with the lower rim 58 and the upper rim 83 of the inflator body 61.

As for the vulcanized tire T that has been cooled, after the holding body 82 moves downward and holds the upper rim 83, the supporting body 85 moves outwards in the radial direction, so that the vulcanized tire T that has been cooled is held by the holding body 82 through the upper rim 83. Then, after the fastening of the upper fastening body 84 and the lower fastening body 57 is disengaged, the holding body 82 and the upper mold 38 move upward up to the upper limit. With these movements, the vulcanized tire T that has been cooled moves upward up to the upper limit together with the upper rim 83. Note that, at this time, the conveyor 88 located at the standby position operates, so that the vulcanized tire T is fed frontward (next step).

Next, in response to a control signal from the control means 67, the first servo cylinder and the second servo cylinder 62 are actuated so as to integrally move rearward the movable table 15 and the empty lower mold 17 located at the vulcanization station to the loading station A; the empty lower rim 58 (inflator body 61) located at the cooling station C to the vulcanization station B; and the empty conveyor 88 located at the retracted position to the cooling station C.

The product tire is manufactured as described above. And, by repeating the above-described cycle, the product tires can be manufactured one after another. The lower mold 17 and the inflator body 61 described above may be integrally moved in the front and rear direction by performing the servo control of the first servo cylinder and the second servo cylinder 62 with the control means 67. However, in this embodiment, the lower base 16 having the lower mold 17 attached thereto with the linkage tool 77 is linked to the slide frame 51 supporting the inflator body 61 to make sure that the lower mold 17 and the inflator body 61 move in the integral manner at the time of manufacturing the tire.

Next, if there occurs any change in types of the tire to be manufactured, it is necessary to change the lower mold 17, the upper mold 42, and the lower rim 58 and the upper rim 83 of the post cure inflator 60 according to the change. In such a case, the linkage between the lower mold 17 and the inflator body 61 by means of the linkage tool 77 is disengaged by actuating the linkage cylinder 73 to retract the piston rod 74, and drawing upward the linkage block 75 from the linkage hole 76 of the insertion protrusion 72. At the vulcanization station B, the lower mold 17 is removed from the lower base 16; the upper base 35 is moved downward to place the upper mold 42 on the lower mold 17; then, the upper mold 42 is removed from the upper base 35; and the upper base 35 is moved upward. At this time, the inflator body 61 is located at the cooling station C.

Next, by actuating the first servo cylinder, the lower mold 17 and the upper mold 42 are moved to the loading station A. With this movement, the lower mold 17 and the upper mold 42 placed on the lower mold 17 are located at the loading station A, and the inflator body 61 having the lower rim 58 is located at the cooling station C. At this time, the holding body 82 is lowered at a lower position and slightly above the inflator body 61. Thereafter, the changing operation is performed for the lower mold 17, the upper mold 42, the lower rim 58, and the upper rim 83. At this time, the lower mold 17, the upper mold 42, the lower rim 58, and the upper rim 83 are changed in a wide space, whereby the operation efficiency improves.

Further, at the time of the changing operation as described above, the inflator body 61 having the lower rim 58 can be disposed at a lower position, while the upper rim 83 can be moved downward to the lower position. This makes it possible to perform the changing operation at the lower position, thereby achieving the easy and safety changing operation. Further, at the time of cleaning the lower mold 17 and the upper mold 42, by positioning the inflator body 61 and the lower mold 17 at the cooling station C and the loading station A, respectively, it is possible to secure a large operation space around the lower mold 17 and below the upper mold 42, whereby the efficiency of the cleaning operation improves.

It should be noted that, in the present invention, as the transporting means, it may be possible to employ, for example, a screw mechanism and a rack and pinion mechanism driven by a driving motor. Further, in the present invention, it may be possible to employ a configuration in which: the transporting mechanism is formed, for example, by a single fluid cylinder; at the time of manufacturing the tire, the lower mold 17 and the inflator body 61 are linked by means of the linkage tool 77 to integrally move them; at the time of changing the lower mold 17, the upper mold 42, the lower rim 58 and the upper rim 83, the inflator body 61 remains at the cooling station C; and after the linkage between the lower mold 17 and the inflator body 61 is disengaged, the lower mold 17 is moved to the loading station A, for example, with the fluid cylinder.

INDUSTRIAL APPLICABILITY

The present invention is applicable to the industrial field of manufacturing the tire by vulcanizing the green tire and then cooling the vulcanized tire.

EXPLANATION OF REFERENCE CHARACTERS

17 Lower mold
42 Upper mold
58 Lower rim
59 Driving mechanism
60 Post cure inflator
61 Inflator body
62 Second transporting mechanism
68 Transporting means 77 Linkage too
83 Upper rim
85 Supporting body
88 Conveyor
A Loading station
B Vulcanizing station
C Cooling station
G Green tire
T Vulcanized tire

The invention claimed is:

1. A method for manufacturing a tire, including:
   a first step of
      when, among a loading station, a vulcanization station, and a cooling station, each of which is disposed from a rear toward a front so as to be spaced to each other, a lower mold is located at the loading station and an inflator body of a post cure inflator having a lower rim is located at the vulcanization station,
      placing a loaded green tire on the lower mold,
      lowering an upper mold holding a vulcanized tire disposed at the vulcanization station,
      transferring said vulcanized tire to the lower rim of the inflator body,
      and then, moving upward the empty upper mold;
   a second step of
      integrally moving forward the lower mold having the green tire placed thereon and the inflator body supporting the vulcanized tire by means of transporting means until the lower mold reaches the vulcanization station and the inflator body reaches the cooling station;
   a third step of
      lowering the upper mold to vulcanize the green tire in cooperation with the lower mold located at the vulcanization station to obtain the vulcanized tire,
      moving upward the upper mold holding said vulcanized tire,
      lowering the upper rim of the post cure inflator provided at the cooling station to support the vulcanized tire in cooperation with the inflator body,
      cooling the vulcanized tire with the upper rim and the inflator body, and
      moving upward said upper rim; and
   a fourth step of
      integrally moving rearward the empty lower mold and the empty inflator body by means of the transporting means until the lower mold reaches the loading station and the inflator body reaches the vulcanization station.

2. An apparatus for manufacturing a tire, comprising:
   a lower mold capable of moving between a loading station and a vulcanization station among the loading station, the vulcanization station, and a cooling station, each of which is disposed from a rear toward a front so as to be spaced to each other, said lower mold having a fed green tire placed thereon at the time when being located at the loading station;
   an inflator body of a post cure inflator disposed in front of the lower mold and capable of moving between the vulcanization station and the cooling station, said inflator body having a lower rim capable of supporting a vulcanized tire, and said inflator body being capable of moving together with the lower mold in an integral manner;
   an upper mold disposed at the vulcanization station so as to be able to move upward and downward, said upper mold moving downward to vulcanize the green tire in cooperation with the lower mold located at the vulcanization station to obtain the vulcanized tire, said upper mold moving upward and downward while holding said vulcanized tire, so that said vulcanized tire can be transferred to the lower rim of the inflator body located at the vulcanization station;
   an upper rim of the post cure inflator disposed at the cooling station so as to be able to move upward and downward, said upper rim moving downward to support the vulcanized tire in cooperation with the inflator body located at the cooling station while cooling the vulcanized tire; and
   transporting means that transports the lower mold and the inflator body in a front and rear direction.

3. The apparatus for manufacturing a tire according to claim 2, wherein
   the lower mold and the inflator body are designed so as to be able to be separated from each other, and
   the lower mold and the upper mold placed above said lower mold are moved with transporting means so as to be located at the loading station, and the inflator body is moved with the transporting means so as to be located at the cooling station at the time of changing the upper mold, the lower mold, the upper rim, and the lower rim.

4. The apparatus for manufacturing a tire according to claim 3, wherein
   the transporting means is formed by a first transporting mechanism for moving the lower mold through a servo control and a second transporting mechanism for moving the inflator body through the servo control, and
   the lower mold and the inflator body move integrally or separately with the first transporting mechanism and the second transporting mechanism.

5. The apparatus for manufacturing a tire according to claim 3, wherein
   a linkage tool capable of linking and disengaging the lower mold and the inflator body is provided such that the lower mold and the inflator body are linked by the linkage tool at the time of manufacturing the tire, and the linking by the linkage tool is disengaged at the time of changing the upper mold, the lower mold, the upper rim, and the lower rim.

6. The apparatus for manufacturing a tire according to claim 2, further comprising:
   a supporting body provided to the upper rim and capable of supporting the vulcanized tire; and
   a conveyor connected to the inflator body and capable of entering and retracting from the cooling station with the movement of the inflator body, wherein
   when the inflator body is located at the cooling station, the upper rim is moved upward after the vulcanized tire that has been cooled is supported by the supporting body, the conveyor enters the cooling station with the movement of the inflator body to the vulcanization station, and the vulcanized tire is released from the supporting by the supporting body and is supplied to the conveyor.

7. The apparatus for manufacturing a tire according to claim 3, further comprising:
   a supporting body provided to the upper rim and capable of supporting the vulcanized tire; and
   a conveyor connected to the inflator body and capable of entering and retracting from the cooling station with the movement of the inflator body, wherein
   when the inflator body is located at the cooling station, the upper rim is moved upward after the vulcanized tire that has been cooled is supported by the supporting body, the conveyor enters the cooling station with the movement of the inflator body to the vulcanization station, and the vulcanized tire is released from the supporting by the supporting body and is supplied to the conveyor.

8. The apparatus for manufacturing a tire according to claim 4, further comprising:
   a supporting body provided to the upper rim and capable of supporting the vulcanized tire; and
   a conveyor connected to the inflator body and capable of entering and retracting from the cooling station with the movement of the inflator body, wherein
   when the inflator body is located at the cooling station, the upper rim is moved upward after the vulcanized tire that has been cooled is supported by the supporting body, the conveyor enters the cooling station with the movement of the inflator body to the vulcanization station, and the vulcanized tire is released from the supporting by the supporting body and is supplied to the conveyor.

9. The apparatus for manufacturing a tire according to claim 5, further comprising:
   a supporting body provided to the upper rim and capable of supporting the vulcanized tire; and
   a conveyor connected to the inflator body and capable of entering and retracting from the cooling station with the movement of the inflator body, wherein
   when the inflator body is located at the cooling station, the upper rim is moved upward after the vulcanized tire that has been cooled is supported by the supporting body, the conveyor enters the cooling station with the movement of the inflator body to the vulcanization station, and the vulcanized tire is released from the supporting by the supporting body and is supplied to the conveyor.

* * * * *